(12) United States Patent
Liu et al.

(10) Patent No.: US 11,079,932 B2
(45) Date of Patent: Aug. 3, 2021

(54) POP-UP ADJUSTMENT FOR MOBILE DEVICES

(71) Applicant: International Business Machines Corporation, Armonk, NY (US)

(72) Inventors: Hong Gang Liu, Shanghai (CN); Na Fei Yang, Beijing (CN); Biao Cao, Beijing (CN); Shi Lin Huang, Beijing (CN); YaLian Pan, Beijing (CN); Yi Chun Huang, Beijing (CN); Shuang Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/173,670

(22) Filed: Oct. 29, 2018

(65) Prior Publication Data

US 2020/0133481 A1 Apr. 30, 2020

(51) Int. Cl.
| | |
|---|---|
| *G06F 3/048* | (2013.01) |
| *G06F 3/0488* | (2013.01) |
| *G06F 3/0484* | (2013.01) |
| *G06F 3/0481* | (2013.01) |
| *G06F 3/01* | (2006.01) |

(52) U.S. Cl.
CPC ........ *G06F 3/04886* (2013.01); *G06F 3/0481* (2013.01); *G06F 3/04845* (2013.01)

(58) Field of Classification Search
CPC ......... G06F 3/0482; G06F 2203/04806; G06F 3/017; G06F 3/04845; G06F 2203/04108; G06F 3/04815; G06F 3/04817; G06F 3/04842; G06F 3/0485; G06F 3/0488
See application file for complete search history.

(56) References Cited

U.S. PATENT DOCUMENTS

| | | | | |
|---|---|---|---|---|
| 6,496,981 | B1 * | 12/2002 | Wistendahl | G11B 27/034 |
| | | | | 345/619 |
| 9,470,922 | B2 * | 10/2016 | Otake | G06F 3/0488 |
| 2006/0101354 | A1 * | 5/2006 | Hashimoto | G06F 40/134 |
| | | | | 715/863 |

(Continued)

FOREIGN PATENT DOCUMENTS

| | | |
|---|---|---|
| FR | 3024913 A1 | 2/2016 |
| WO | 2017143477 A1 | 8/2017 |

OTHER PUBLICATIONS

"About Dialog Boxes"; URL: https://msdn.microsoft.com/en-us/library/windows/desktop/ms644994(v=vs.85).aspx; Retrieved May 30, 2018; 11 Pages.

(Continued)

*Primary Examiner* — Nicholas Augustine
(74) *Attorney, Agent, or Firm* — Cantor Colburn LLP; Teddi Maranzano

(57) ABSTRACT

Determining the position of a pop-up on a touch screen. Locations of user interactions on a touch screen are determined. Times are also determined for each of the user interactions. A hot spot on the touch screen is defined on the touch screen based on a number of user interactions occurring in proximity of one another during a particular period of time. In one or more embodiments, the particular time period corresponds with a most recent period of time. At least a portion of a pop-up is then displayed within the hot spot on the touch screen for user interaction.

19 Claims, 5 Drawing Sheets

(56) References Cited

U.S. PATENT DOCUMENTS

| | | |
|---|---|---|
| 2007/0094612 A1 | 4/2007 | Kraft et al. |
| 2007/0192734 A1 | 8/2007 | Berstis et al. |
| 2008/0176528 A1* | 7/2008 | Kim .................... G06F 3/0488 455/187.1 |
| 2011/0148776 A1* | 6/2011 | Hautala ............... G06F 3/04883 345/173 |
| 2012/0072867 A1* | 3/2012 | Schlegel ............... G06F 3/0481 715/808 |
| 2014/0359479 A1 | 12/2014 | Kamdar |
| 2016/0162169 A1 | 6/2016 | Xu |
| 2019/0258378 A1* | 8/2019 | Hashimoto ............. G06F 3/041 |

OTHER PUBLICATIONS

Sheikh; "Modifying a Modal Dialog's Style and Position at Run Time"; URL: https://www.codeproject.com/Articles/13133/Modifying-a-modal-dialog-s-style-and-position-at-r; Feb. 20, 2006; 4 Pages.
Code Project "Modifying a modal dialog's style and position at run time", retrieved at: https://www.codeproject.com/Articles/13133/Modifying-a-modal-dialog-s-style-and-position-at-r; downloaded Dec. 14, 2017; 4 pgs.

* cited by examiner

POP-UP ADJUSTMENT FOR MOBILE DEVICES

BACKGROUND

The invention relates generally to pop-ups and, more particularly, relates to adjusting the location of the pop-ups on mobile devices.

Interfacing with a touch screen of an electronic device such as a mobile phone is sometimes difficult because of the reduced size of the display. In particular, it is sometimes difficult to touch the screen in the desired location with a finger while holding the mobile device. Thus, when a window appears on the touch screen, it is often difficult to touch the correct location on the touch screen in order to select a desired button of the pop-up window. What is needed is positioning of the pop-up window where it will be more easily used based on how the touch screen was recently used.

SUMMARY

According to a non-limiting embodiment, a method for determining where to position a pop-up on a touch screen is provided. The method includes determining a location of each of a plurality of user interactions on a touch screen and determining a time for each of the plurality of user interactions. The method also includes defining a hot spot on the touch screen based on a number of user interactions occurring with the touch screen in the proximity of one another during a particular period of time and displaying, for user interaction, at least a portion of a pop-up within the hot spot.

According to another non-limiting embodiment, a system for determining where to position a pop-up on a touch screen is provided. The system includes a processor coupled to a memory unit, wherein the processor is configured to execute program instructions. The program instructions include determining a location of each of a plurality of user interactions on a touch screen and determining a time for each of the plurality of user interactions. The program instructions also include defining a hot spot on the touch screen based on a number of user interactions occurring with the touch screen in the proximity of one another during a particular period of time and displaying, for user interaction, at least a portion of a pop-up within the hot spot.

According to yet another non-limiting embodiment, a computer program product is provided. The computer program product includes a computer readable storage medium having program instructions embodied therewith, the program instructions executable by a computer processor to cause the computer processor to perform a method for determining where to position a pop-up on a touch screen. The method includes determining a location of each of a plurality of user interactions on a touch screen and determining a time for each of the plurality of user interactions. The method also includes defining a hot spot on the touch screen based on a number of user interactions occurring with the touch screen in the proximity of one another during a particular period of time and displaying, for user interaction, at least a portion of a pop-up within the hot spot.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

Figure 1:
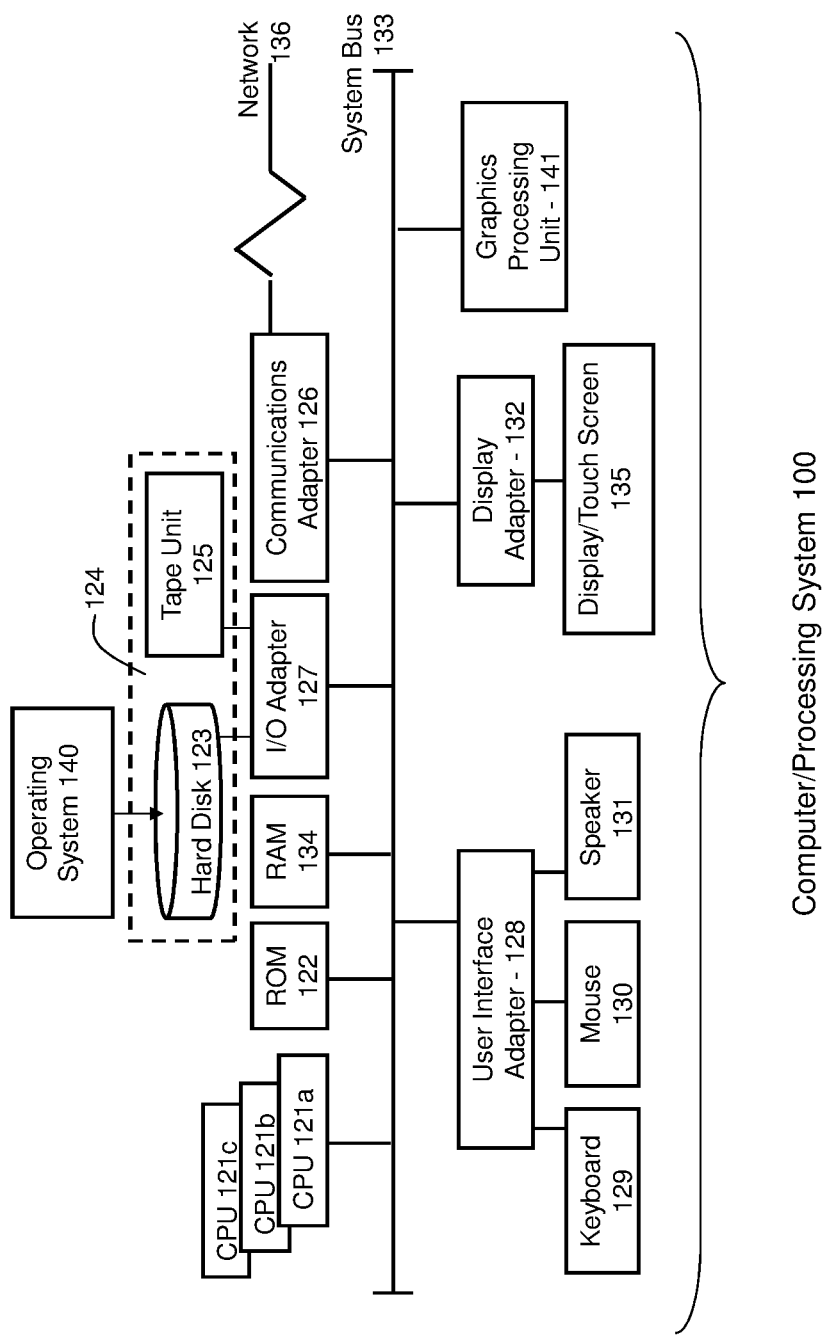
FIG. 1 depicts a block diagram illustrating an exemplary computer processing system that may be utilized to implement one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment of a processing system, commonly referred to as a computer system 100, for implementing the teachings herein. The computer system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124. Operating system 140 for execution on the processing system 100 may be stored in mass storage 124. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. The computer system 100 also includes a display/touch screen 135. The display/touch screen 135 is an input device where a user can interact directly with what is displayed by giving input by touching the touch screen with one or more fingers or with a stylus. In one or more embodiments, the display/touch screen 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 124, input means such as keyboard 129, mouse 130 and display/touch screen 135, and output capability including speaker 131 and display/touch screen 135. In one embodiment, a portion of RAM 134 and mass storage 124 collectively store the operating system to coordinate the functions of the various components shown in FIG. 1.

Figure 2:
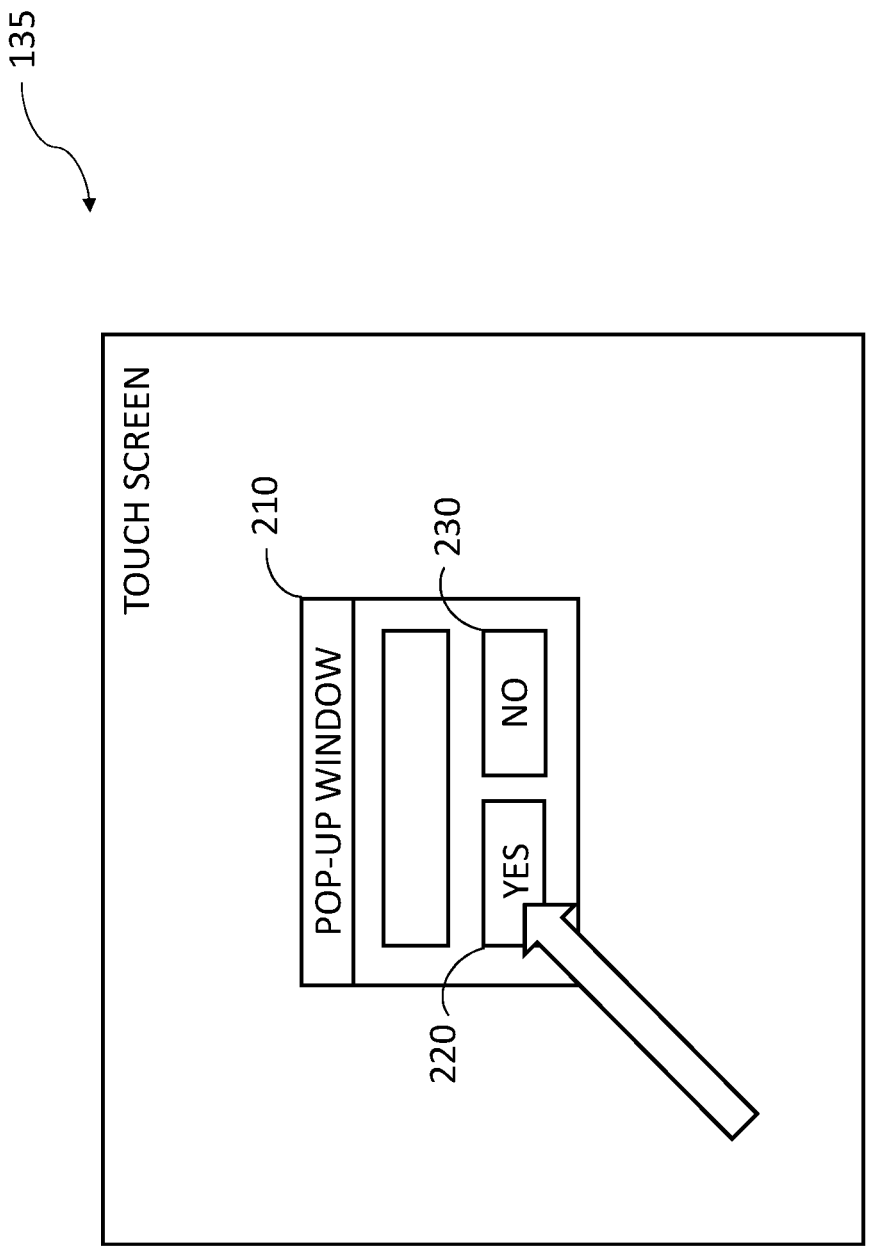
FIG. 2 depicts a touch screen with a pop-up window that may be utilized to implement one or more embodiments of the present invention.

In one or more embodiments, the computer system 100 is a portable computer system 100 such as a laptop or a mobile device such as a personal digital assistant (PDA) or a phone. FIG. 2 is an exemplary embodiment of the touch screen 135 of the computer system 100 displaying a pop-up 210 wherein the pop-up 210 is requesting user interaction such as a gesture or a click. In one or more embodiments, the pop-up 210 may be, for example, a pop-up window such as a pop-up notification, a pop-up menu, or a pop-up advertisement. A pop-up menu is a menu in a graphical user interface (GUI) offering a set of choices for user selection. A pop-up advertisement is a pop-up window containing an advertisement. Also, in one or more embodiments, the pop-up can be a new browser window.

Still referring to FIG. 2, the touch screen 135 depicts the pop-up 210 is the form of a pop-up window having buttons 220 and 230. However, the pop-up 210 may have any number of buttons. In FIG. 2, an arrow is shown to depict a selection of the YES button 220. Upon each occurrence of a user interaction upon the touch screen 135, such as selection of the YES button 220, the location of the user interaction is determined and stored, for example, in mass storage 124. The location determined as a result of the selection of the YES button 220 is on the touch screen 135 directly underneath the YES button 220. Thus, for every occurrence of a user interaction with the touch screen 135, a location is determined and stored. Also, a time corresponding with each user interaction is determined and stored.

Usage of the touch screen 135 can be broken into different periods of time. For example, one or more time periods can be based on when the touch screen 135 was being used and when it was not. Also, time periods can correspond with different days or portions of a day. In one or more embodiments, time periods can be based on different orientations of the touch screen 135 or device. Preferably, the time periods can be defined based on how recent in time the user's interactions were. For example, some of the locations of the user's interactions can be grouped based on a particular time period such as the most recent time period of a group of time periods.

Figure 3:
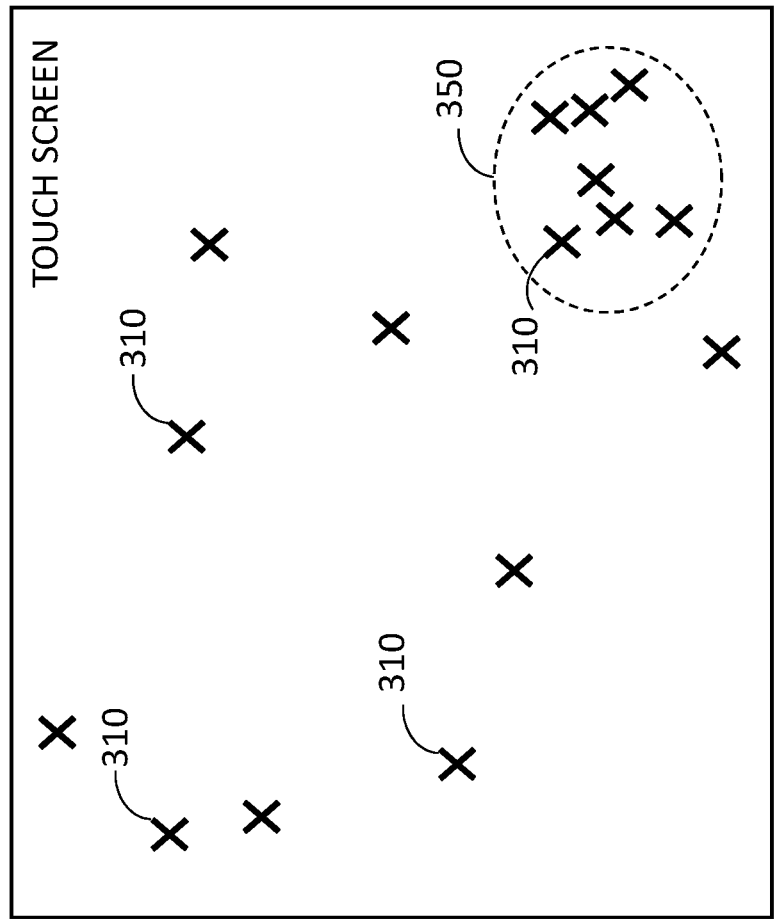
FIG. 3 depicts identifying the locations of previous user interactions on the touch screen during a particular time period according to one or more embodiments of the present invention.

Over time, the determined locations occurring on the touch screen 135 in close proximity to one another, during a time period, define at least one hot spot. Also, multiple hotspots can be defined for one or more time periods and one or more hot spots can exist or extend over more than one time period. FIG. 3 depicts a plurality of determined locations 310 marked by the symbol "X" on the touch screen 135. In the bottom right corner of the touch screen, an exemplary hot spot 350 is depicted. The confines of the hot spot 350 include seven X's in proximity of one another that have occurred during a particular time period. In at least one embodiment, at least some of the user interactions occurring in association with a hot spot are associated with a particular user interface of an application wherein the pop-up displayed in the hot spot is associated with that application.

Figure 4:
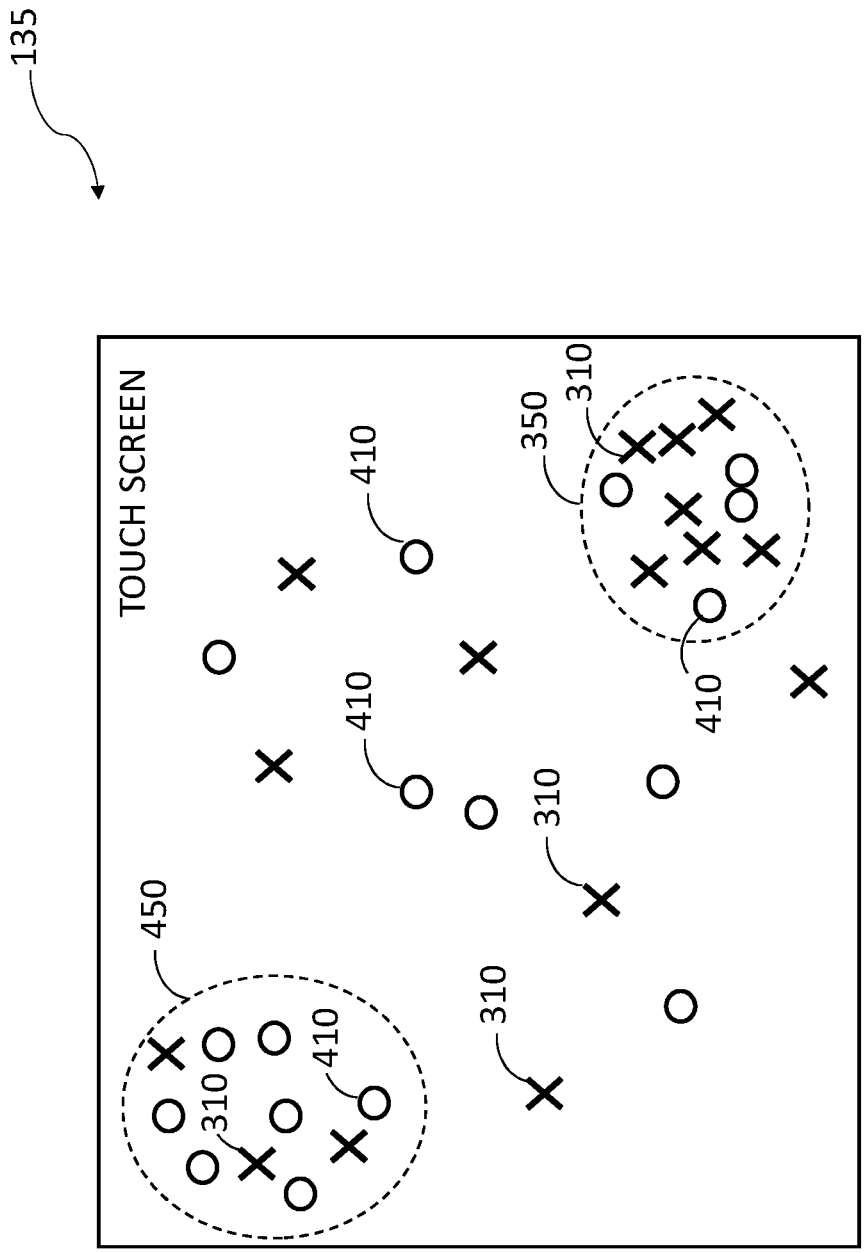
FIG. 4 depicts identifying the locations of previous user interactions on the touch screen during two different time periods according to one or more embodiments of the present invention.

FIG. 4 depicts an exemplary embodiment of determined locations marked during two or more time periods. For purpose of illustrating one or more aspects of the present disclosure, X marks the determined locations 310 of user interactions that had occurred during one time period and ○ marks the determined locations 410 of other user interactions that had occurred during another different time period. The first hot spot 350 corresponding with the one time period having the X marked locations 310 is depicted in the bottom right corner of the touch screen 135 and a second hot spot 450 corresponding with the other time period having the ○ marked locations 410 is depicted in the top left corner of the touch screen 135. For example, the X marked locations 310 could correspond with the user interactions that have occurred during a most recent period of time and the ○ marked locations 410 could correspond with the user interactions that have occurred during a period of time other than the most recent period of time. Although both X marked locations 310 and ○ marked locations 410 are depicted in each of the hot spots 350, 450, whether each is defined as a hot spot depends on the individual number of X marked locations 310 or the individual number of ○ marked locations 410 in proximity of one another and on different time periods.

Once a particular hot spot is defined, the pop-up 210 is displayed such that at least a portion of the pop-up 210 is displayed within the hot spot in order to make subsequent user interaction with the pop-up more convenient in view of the previous user interactions upon which the hot spot was based. For example, in one or more embodiments, one or more buttons such as the YES and NO buttons 220, 230 are preferably positioned within the confines of the hot spot. In FIG. 4, for example, the buttons 220, 230 of the pop-up 210 would be displayed within either hot spot 350 or hot spot 450 depending on the referenced period of time. If the most recent period of time is used, for example, the buttons 220, 230 would be displayed within hot spot 450 based on the description above characterizing the determined locations of hot spot 450 as the most recent.

In one or more embodiments, a position of a hot spot on the touch screen 135 can be redefined. For example, a hot spot could be moved or adjusted to a different position based on more recent user interactions during a more recent time period. Also, a hot spot may be resized. For example, a hot spot could be enlarged or made smaller based on more recent user interactions during a more recent time period.

Figure 5:
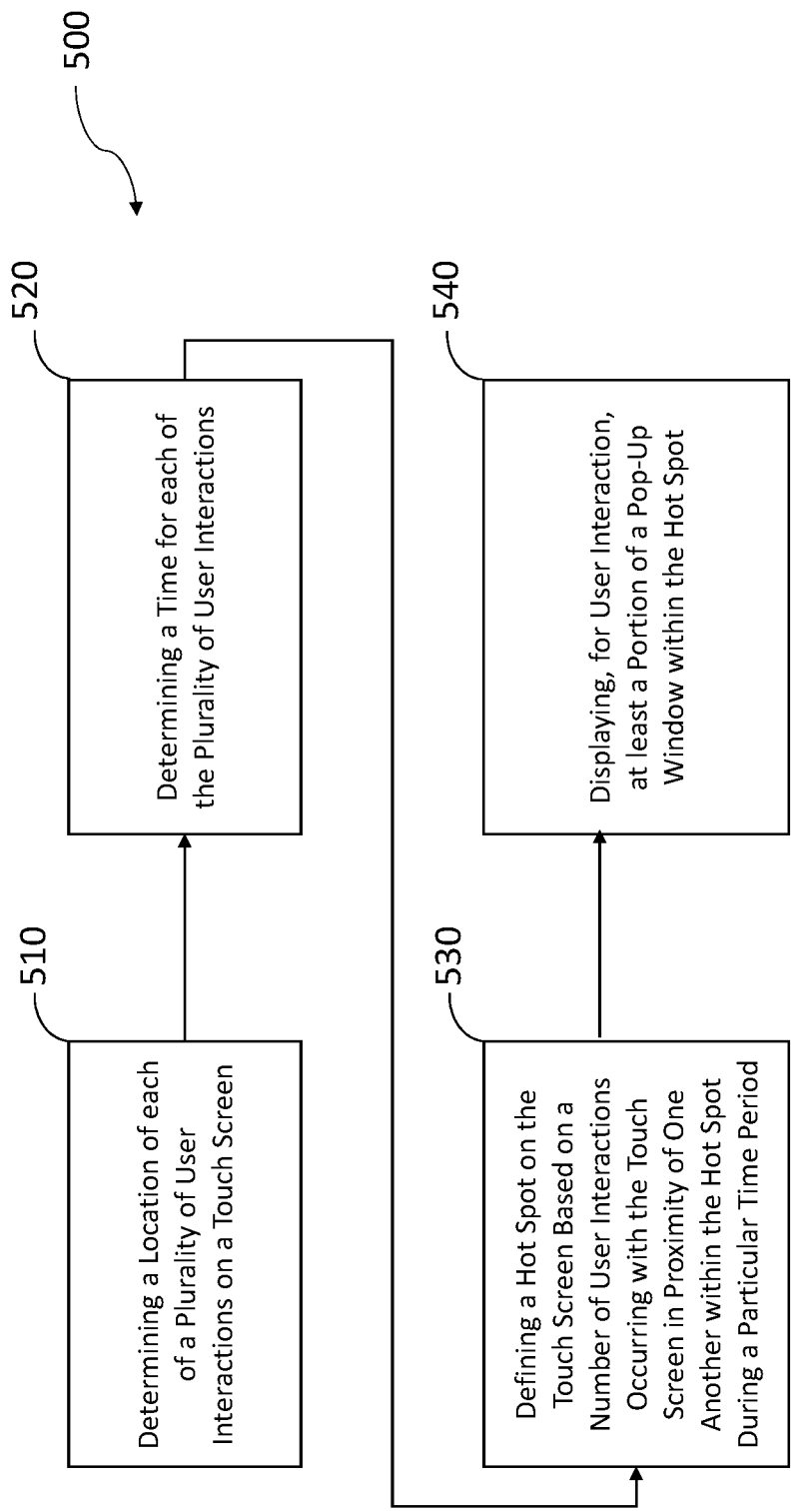
FIG. 5 is a flow diagram illustrating a method for determining the position of a pop-up window on a touch screen according to one or more embodiments of the present invention.

Turning to FIG. 5, one or more embodiments may include a method 500 for determining where to position a pop-up window on a touch screen. The flow diagram of FIG. 5 illustrates the method 500 that includes process block 510 for determining a location of each of a plurality of user interactions on a touch screen and process block 520 for determining a time for each of the plurality of user interactions. The method 500 also includes process block 530 for defining a hot spot on the touch screen based on a number of user interactions occurring with the touch screen in proximity of one another during a particular period of time and process block 540 for displaying, for user interaction, at least a portion of a pop-up window within the hot spot.

Various technical benefits are achieved using the system and methods described herein, including the capability of providing enhanced performance for applications with exclusive access to the co-processors while also allowing applications that do not need performance access to accelerators when shared access is available. In this manner, the computing device can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining where to position a pop-up window on a touch screen, the method comprising:
    determining a location of each of a plurality of user interactions on a touch screen;
    determining a time for each of the plurality of user interactions;
    defining a hot spot on the touch screen based on a number of user interactions occurring with the touch screen in proximity of one another during a particular period of time; and
    displaying, for user interaction, at least a portion of a pop-up within the hot spot,
    wherein at least some of the user interactions occurring are associated with a particular user interface of an application and wherein the pop-up displayed in the hot spot is associated with the application and wherein the particular time period during which the user interactions occurred for defining the hot spot is based on a time of day.

2. The method of claim 1 further comprising determining a location of each of a plurality of user interactions on the touch screen during different periods of time.

3. The method of claim 2 defining a second hot spot on the touch screen based on a number of user interactions occurring with the touch screen within the second hot spot during a period of time other than a most recent period of time.

4. The method of claim 1 wherein the particular time period during which the user interactions occurred for defining the hot spot is further based on one or more of the following:
    when the touch screen was being used;

orientation of a mobile device comprising the touch screen; and most recent use of the touch screen.

5. The method of claim 1 wherein the particular time period is a most recent time period.

6. The method of claim 1 further comprising redefining a position of the hot spot based on more recent user interactions during a more recent time period.

7. The method of claim 1 further comprising redefining a size of the hot spot based on more recent user interactions during a more recent time period.

8. The method of claim 1 wherein displaying, for user interaction, at least a portion of a pop-up within the hot spot comprises displaying a button of the pop-up within the hot spot.

9. A system for determining where to position a pop-up on a touch screen, the system comprising:

a processor coupled to a memory unit, wherein the processor is configured to execute program instructions comprising:

determining a location of each of a plurality of user interactions on a touch screen;

determining a time for each of the plurality of user interactions;

defining a hot spot on the touch screen based on a number of user interactions occurring with the touch screen in proximity of one another during a particular period of time; and displaying, for user interaction, at least a portion of a pop-up within the hot spot wherein at least some of the user interactions occurring are associated with a particular user interface of an application and wherein the pop-up displayed in the hot spot is associated with the application and wherein the particular time period during which the user interactions occurred for defining the hot spot is based on a time of day.

10. The system of claim 9 further comprising determining a location of each of a plurality of user interactions on the touch screen during different periods of time.

11. The system of claim 9 further comprising defining a second hot spot on the touch screen based on a number of user interactions occurring with the touch screen within the second hot spot during a period of time other than a most recent period of time.

12. The system of claim 9 wherein at least some of the user interactions occurring are associated with a particular user interface of an application and wherein the pop-up displayed in the hot spot is associated with the application.

13. The system of claim 12 wherein the particular time period during which the user interactions occurred for defining the hot spot is based on one or more of the following:

when the touch screen was being used;

time of day;

orientation of a mobile device comprising the touch screen; and most recent use of the touch screen.

14. The system of claim 9 wherein the particular time period is a most recent time period.

15. A computer program product comprising a computer readable storage medium having program instructions embodied therewith, the program instructions executable by a computer processor to cause the computer processor to perform a method for determining where to position a pop-up on a touch screen, comprising:

determining a location of each of a plurality of user interactions on a touch screen;

determining a time for each of the plurality of user interactions;

defining a hot spot on the touch screen based on a number of user interactions occurring with the touch screen in proximity of one another during a particular period of time; and displaying, for user interaction, at least a portion of a pop-up within the hot spot wherein at least some of the user interactions occurring are associated with a particular user interface of an application and wherein the pop-up displayed in the hot spot is associated with the application and wherein the particular time period during which the user interactions occurred for defining the hot spot is based on a time of day.

16. The computer program product of claim 15 further comprising determining a location of each of a plurality of user interactions on the touch screen during different periods of time.

17. The computer program product of claim 15 further comprising defining a second hot spot on the touch screen based on a number of user interactions occurring with the touch screen within the second hot spot during a period of time other than a most recent period of time.

18. The computer program product of claim 15 further comprising redefining a position of the hot spot based on more recent user interactions during a more recent time period.

19. The computer program product of claim 15 wherein the particular time period is a most recent time period.

* * * * *